United States Patent
Lochmann

(10) Patent No.: US 8,132,147 B2
(45) Date of Patent: Mar. 6, 2012

(54) SEMANTIC INTERPRETATION OF SOFTWARE MODELS FOR GENERATING USER INTERFACES

(75) Inventor: Henrik Lochmann, Dresden (DE)

(73) Assignee: SAP AG, Walldorf, DE (US)

( * ) Notice: Subject to any disclaimer, the term of this patent is extended or adjusted under 35 U.S.C. 154(b) by 1142 days.

(21) Appl. No.: 11/807,384

(22) Filed: May 29, 2007

(65) Prior Publication Data

US 2008/0301628 A1  Dec. 4, 2008

(51) Int. Cl.
G06F 9/44 (2006.01)
(52) U.S. Cl. ......................................... 717/106
(58) Field of Classification Search ........... 717/104–108
See application file for complete search history.

(56) References Cited

U.S. PATENT DOCUMENTS

| | | | | |
|---|---|---|---|---|
| 7,039,875 | B2 * | 5/2006 | Khalfay et al. | 715/762 |
| 7,941,438 | B2 * | 5/2011 | Molina-Moreno et al. | 707/756 |
| 2004/0187140 | A1 * | 9/2004 | Aigner et al. | 719/328 |
| 2006/0059461 | A1 * | 3/2006 | Baker et al. | 717/113 |
| 2007/0038947 | A1 * | 2/2007 | Brandl et al. | 715/762 |
| 2008/0270466 | A1 * | 10/2008 | Claussen et al. | 707/103 Y |
| 2008/0275910 | A1 * | 11/2008 | Molina-Moreno et al. | 707/103 R |
| 2009/0125892 | A1 * | 5/2009 | Crewdson | 717/136 |
| 2010/0050152 | A1 * | 2/2010 | Gilboa | 717/106 |

OTHER PUBLICATIONS

Seam-Contextual Components; A Framework for Java EE 5; JBoss.com; Dec. 13, 2006.
Richard Gronback; GMF Tutorial; Eclipsepedia; Apr. 24, 2007.
Richard Gronback; GMF Tutorial Part 2; Eclipsepedia; Jan. 9, 2007.
Richard Gronback; GMF Tutorial Part 3; Eclipsepedia; Mar. 5, 2007.
Richard Gronback; GMF Tutorial Part 4; Eclipsepedia; Jan. 9, 2007.
Introduction to the Eclipse Graphical Modeling Framework; eclipseCON 2006; Borland, IBM; Mar. 21, 2006.
Developer Guide to the GMF Runtime Framework,;Eclipsepedia; 2005.

\* cited by examiner

*Primary Examiner* — Anna Deng
(74) *Attorney, Agent, or Firm* — Fountainhead Law Group PC

(57) ABSTRACT

In one embodiment the present invention includes a method of generating a user interface comprising storing an interpretation model that describes program logic corresponding to a user interface for a computer program. Elements of the interpretation model may be bound with one or more user interface fragments. In one embodiment, the UI fragments may be specified in a user interface specification. User interface components may be generated based on said interpretation model, the user interface components comprising a plurality of said user interface fragments. In one embodiment, if the program logic is changed, a new user interface may be generated that works with the changed program logic.

26 Claims, 7 Drawing Sheets

SEMANTIC INTERPRETATION OF SOFTWARE MODELS FOR GENERATING USER INTERFACES

BACKGROUND

The present invention relates to user interfaces for computer programs, and in particular, to systems and methods for generating user interfaces.

User interfaces provide a mechanism that allow human beings to interact with computer systems. A wide variety of user interfaces exist. User interfaces may include menus, window, buttons, tables, icons and a variety of other graphical means for representing functionality, operations, or elements of a computer program. However, user interfaces are traditionally designed to work specifically with the underlying computer program so that the computer program's logic that may be accessed or influenced by a user can be represented in the user interface. Thus, user interfaces tend to be customized for the underlying program logic.

One problem with customizing user interfaces with the underlying program logic is that program logic may change. For example, functionality of the program logic that is effected by a user may be added, deleted, or otherwise modified. When changes are made to the program logic, redesign and reprogramming of the user interface is typically required. Redesigning and reprogramming the user interface can often be time consuming and expensive, potentially requiring many hours of development and debugging time of a professional computer programmer. What is needed is a technique for decreasing the direct dependency of the user interface on the program logic.

Thus, there is a need for improved systems and methods for generating user interfaces. The present invention solves these and other problems by providing semantic interpretation of software models for generating user interfaces.

SUMMARY

In one embodiment, the present invention includes a method of generating a user interface comprising storing an interpretation model that describes program logic corresponding to a user interface for a computer program, binding elements of the interpretation model with one or more user interface fragments, and generating user interface components based on said interpretation model, the user interface components comprising a plurality of said user interface fragments.

In one embodiment, the interpretation model describes the program logic using an ontology.

In one embodiment, the interpretation model describes the program logic as one or more of an object, an event, a state, and an action.

In one embodiment, interpretation model describes the program logic as one or more of an actuality, an event, a situation, and an action.

In one embodiment, said binding is specified in a user interface specification.

In one embodiment, the interpretation model comprises rules that change the model based on the program logic, and in accordance therewith, the user interface components are automatically adapted to changes in the program logic.

In another embodiment, the present invention includes a method of generating a user interface comprising storing metadata that describes program logic corresponding to a user interface for a computer program, wherein the metadata describes the program logic using metadata elements comprising one or more of a state, an event, a object, and an action, and wherein the metadata further comprises rules specifying alternate configurations of said program logic and corresponding alternate metadata elements, receiving a user interface specification, the user interface specification specifying an association between one or more the metadata elements and one or more user interface fragments, performing a query to search for the one or more metadata elements specified in the user interface specification, wherein the query searches the metadata for the elements specified in the user interface specification in accordance with said rules, returning a query result comprising metadata elements, linking at least some of the metadata elements in the query result with the one or more user interface fragments based on the association specified in the user interface specification, generating first user interface components based on said metadata elements in the query result, the first user interface components comprising a first plurality of said user interface fragments, and changing the program logic, and in accordance therewith, automatically generating second user interface components based on said metadata, the second user interface components comprising a second plurality of said user interface fragments.

In one embodiment, the user interface specification is a template executed on a template engine.

In one embodiment, the user interface components comprise XML files describing a user interface.

In one embodiment, the user interface components comprise controllers for interfacing with the program logic.

In another embodiment, the present invention includes a computer-readable medium containing instructions for controlling a computer system to perform a method of generating a user interface, the method comprising storing metadata that describes program logic corresponding to a user interface for a computer program, wherein the metadata comprises elements including one or more of a situation, an event, an actuality, and an action, linking elements of the metadata with a plurality user interface fragments, generating first user interface components based on said metadata, the first user interface components comprising a first plurality of said user interface fragments, changing the program logic, and in accordance therewith, automatically generating second user interface components based on said metadata, the second user interface components comprising a second plurality of said user interface fragments.

In one embodiment, the metadata describes the program logic using an ontology.

In one embodiment, the metadata describes the program logic as one or more of an object, an event, a state, and an action.

In one embodiment, the metadata describes the program logic as one or more of an actuality, an event, a situation, and an action.

In one embodiment, said binding is specified in a user interface specification.

In one embodiment, the metadata comprises rules that change the model based on the program logic, and in accordance therewith, the user interface components are automatically adapted to changes in the program logic.

In another embodiment, the present invention includes computer system including software for generating a user interface comprising a computer program comprising program logic, an interpretation model that describes said program logic corresponding to a user interface for said computer program as a plurality of model elements, wherein the interpretation model further comprises rules specifying alternate configurations of said program logic and corresponding alternate interpretation model elements, one or more user interface fragments, a user interface specification, the user interface specification specifying an association between one or more of the model elements and the one or more user interface fragments, a user interface component generator for generating first user interface components based on said association between the model elements and the user interface fragments, the first user interface components comprising a first plurality of said user interface fragments, wherein the user interface component generator generates different components according to said rules if the program logic changes. In one embodiment, the interpretation model describes the program logic using an ontology. In one embodiment, the interpretation model describes the program logic using elements comprising one or more of a state, an event, a object, and an action. In another embodiment, the computer system further comprises a query, wherein the query performs search for model elements specified in the user interface specification, and wherein the query searches the interpretation model for the model elements specified in the user interface specification in accordance with said rules and returns a query result comprising model elements, and wherein model elements in the query result are linked with the one or more user interface fragments based on the association specified in the user interface specification.

The following detailed description and accompanying drawings provide a better understanding of the nature and advantages of the present invention.

DETAILED DESCRIPTION

Described herein are techniques for generating user interfaces. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
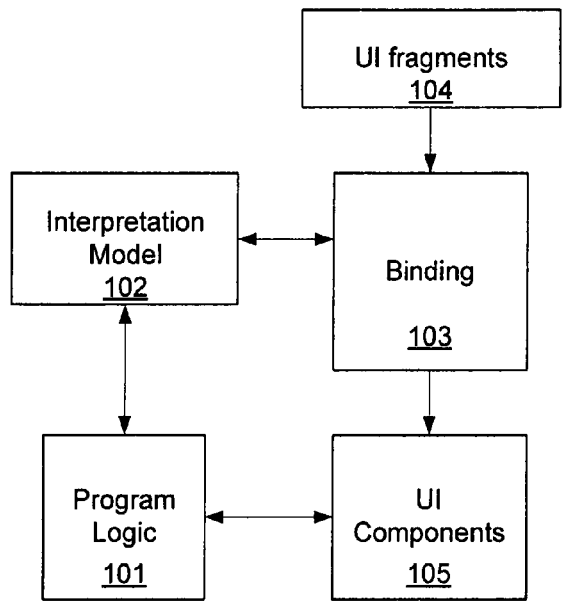
FIG. 1 illustrates a software system for generating user interfaces according to one embodiment of the present invention.

FIG. 1 illustrates a software system for generating user interfaces according to one embodiment of the present invention. In one embodiment, the software system includes a computer program including program logic 101. Computer program logic may include the functions and operations of one or more computer programs. For example, the program logic may include classes (objects), procedures, methods, functions, variables, attributes and a variety of other constructs for implementing the logical behavior of the computer program. In one embodiment, the present invention includes an interpretation model 102 that is used to generate user interface components. Interpretation model 102 describes the program logic corresponding to a user interface ("UI") for the computer program. For instance, the interpretation model may be used to describe the program logic that is impacted by user interaction (e.g., an object may be modified or the program logic may change state based on user interaction). User interface fragments 104 may be provided for use in the user interface. UI fragments 104 may include either visual UI fragments such as a button, frame, menu, table, tree, or any other viewable UI element and/or a functional UI fragment such as executable code for implementing the UI and interfacing with the program logic, for example. Embodiments of the present invention may bind certain program logic (e.g., a state change in the program) with a UI fragment using interpretation model 102. This is illustrated as a binding 103 that binds elements of the interpretation model with one or more UI fragments. As a result, user interface components 105 may be generated. The generated UI components may include a plurality of said user interface fragments (e.g., a window frame and a plurality of buttons and fields) so that particular UI views and functionality may be implemented at runtime that will correspond to the computer program logic 101 to capture and implement the UI.

Figure 2:
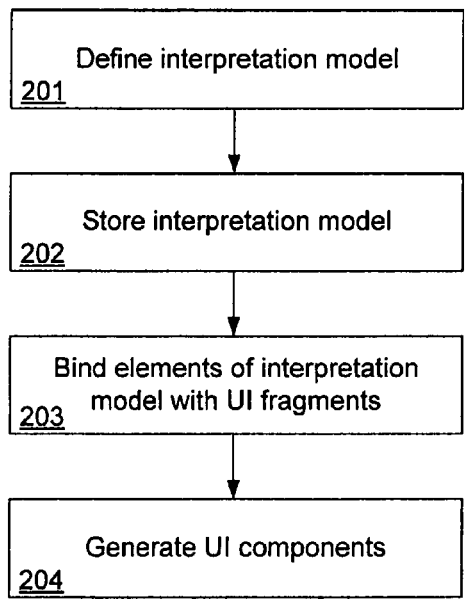
FIG. 2 illustrates a method of generating a user interface according to another embodiment of the present invention.

FIG. 2 illustrates a method of generating a user interface according to one embodiment of the present invention. At 201, an interpretation model may be defined. At 202, the interpretation model may be stored, for example, in computer system memory such as a hard drive, RAM, or any other information storage system. At 203, the system may bind elements of the interpretation model to UI fragments, which may include either visual UI fragments such as a button and/or a functional UI fragment such as executable code for implementing the UI and interfacing with the program logic. At 204, UI components are generated based on the interpretation model. As described in more detail below, the UI components may include view oriented components for describing what is displayed in the UI (e.g., an arrangement of UI fragments such as buttons, frames, tables, etc. . . . ) and operational components for implementing the UI and interfacing with the program logic (e.g., UI controllers implemented in Java).

Figure 3:
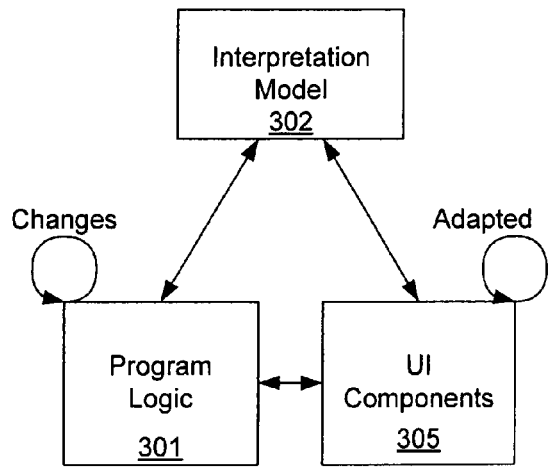
FIG. 3 illustrates an example software system for generating user interfaces according to another embodiment of the present invention.

Accordingly, program logic may be changed for different applications. The changes in the program logic may be captured by the interpretation model and the binding may automatically translate the changes in the program logic into corresponding changes in the user interface (e.g., visual and functional). UI components may be generated so that the changes in the program logic functionality may be reflected in the user interface. As illustrated in FIG. 3, changes in program logic 301 may be captured by interpretation model 302 and used to adapt the UI components 305. In one embodiment, the interpretation model may include rules that change the model based on the available functionality in the program logic.

Accordingly, rule based automatic adaptation of the interpretation model may result in an automatically adapted user interface.

Figure 4:
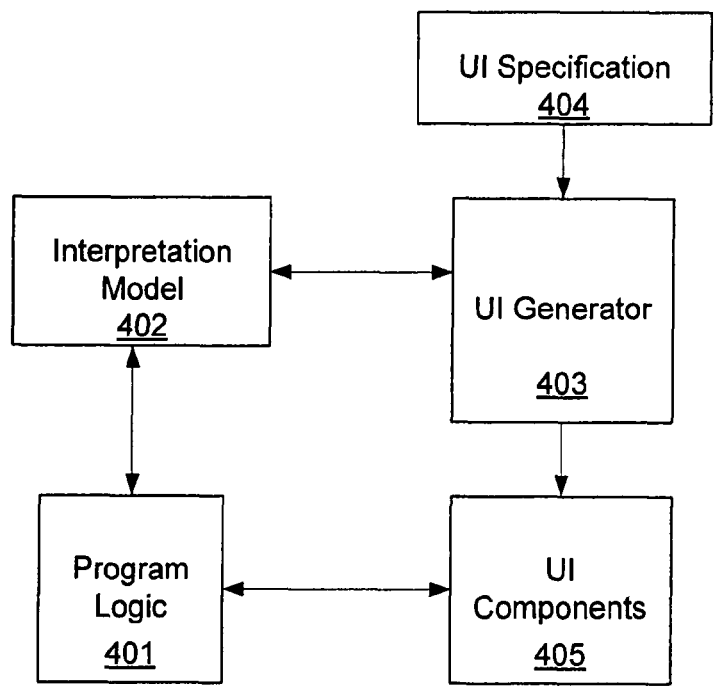
FIG. 4 illustrates a software system for generating user interfaces according to another embodiment of the present invention.

FIG. 4 illustrates a software system for generating user interfaces according to another embodiment of the present invention. In this embodiment, the software system includes a computer program including program logic 401, an interpretation model 402, a UI specification 404, and a UI generator 403 for generating UI components 405. In this example, user interface specification 404 may be provided for specifying the binding between elements of the interpretation model 402 with one or more UI fragments. UI specification 404 may bind certain program logic (e.g., a state change in the program) with a UI fragment (e.g., a button, frame, menu, table, tree, etc. . . . ) displayed to a user. In some applications, UI fragments may also include functionality, such as a function that is carried out if a button is "clicked", for example. Accordingly, if a UI fragment has corresponding UI functionality, the UI specification 404 may be used to bind the interpretation model to the UI functionality. In one embodiment, a UI generator 403 may receive the UI specification 404 and interpretation model 402. UI generator 403 may parse the UI specification 404 and retrieve elements of the UI interpretation model 402 implicated by the UI specification 404. Accordingly, based on the UI specification 404 and interpretation model 402, the UI generator 403 may generate user interface components 405 for implementing a user interface for program logic 401.

Figure 5:
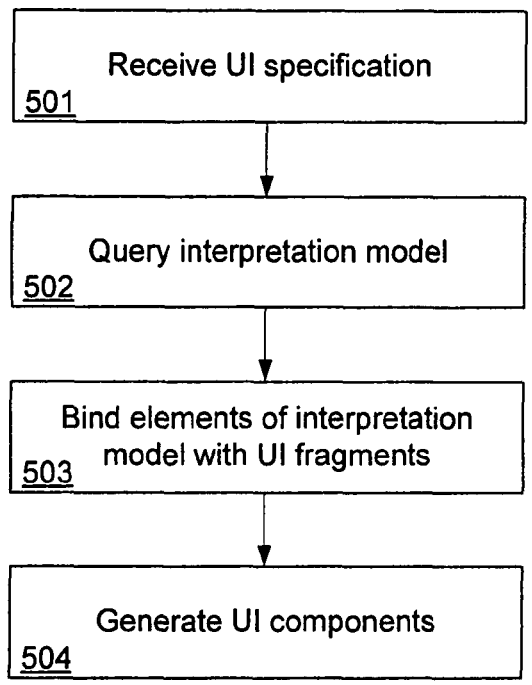
FIG. 5 illustrates a method of generating a user interface according to another embodiment of the present invention.

FIG. 5 illustrates a method of generating a user interface according to another embodiment of the present invention. At 501, a UI specification is received. The UI specification may specify a correspondence between elements of the interpretation model and UI fragments, which may include either visual UI fragments such as a button and/or a functional UI fragment such as code for implementing the UI and interfacing with the program logic. At 502, the interpretation model is queried. The UI specification may specify elements in the interpretation model to search for so that such element may be bound with UI fragments as specified in the UI specification. At 503, the system binds elements of the interpretation model with UI fragments. At 504, UI components may be generated.

EXAMPLE IMPLEMENTATION

Figure 6A:
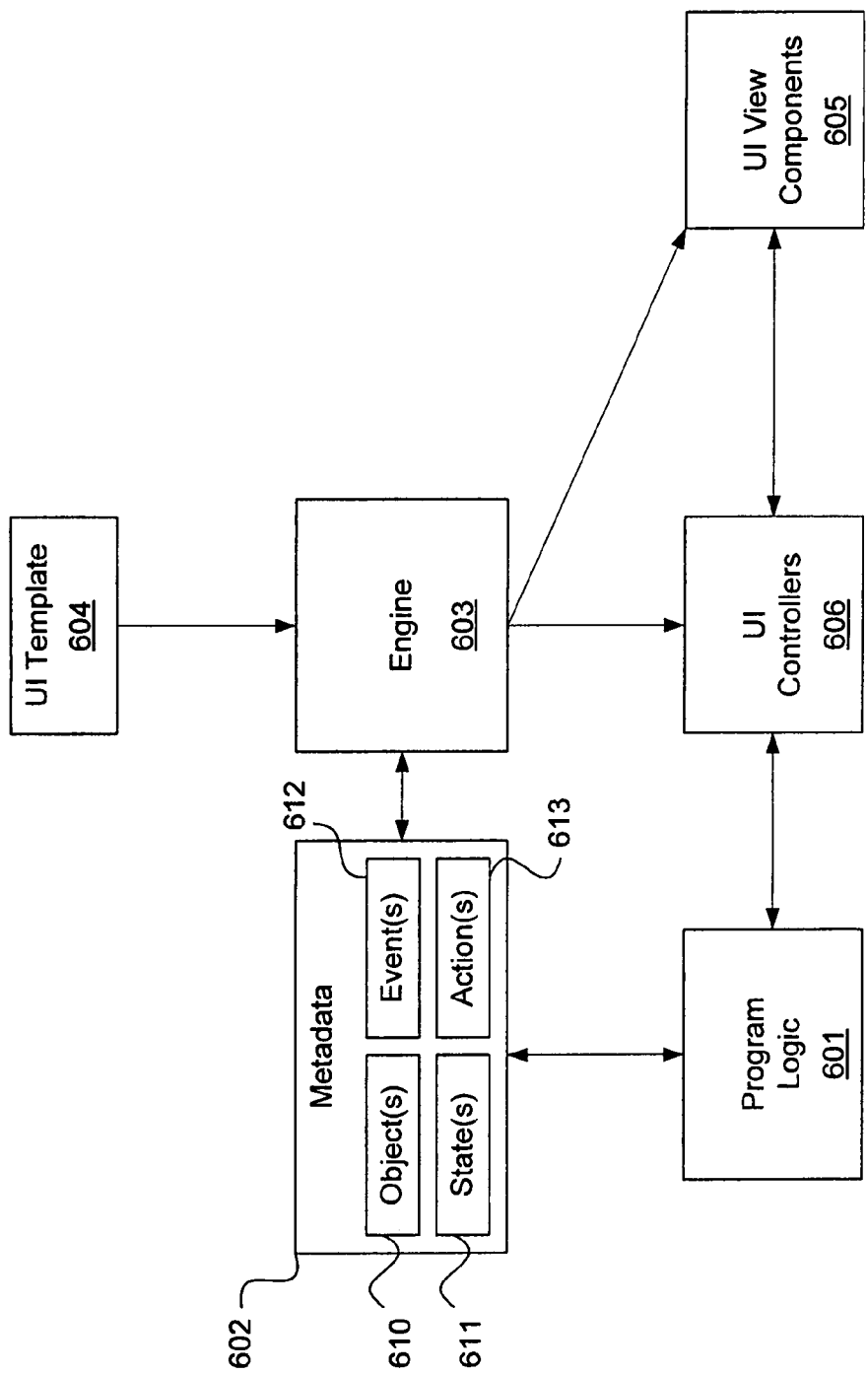
FIG. 6A illustrates an example implementation of a software system for generating user interfaces according to another embodiment of the present invention.
Figure 6B:
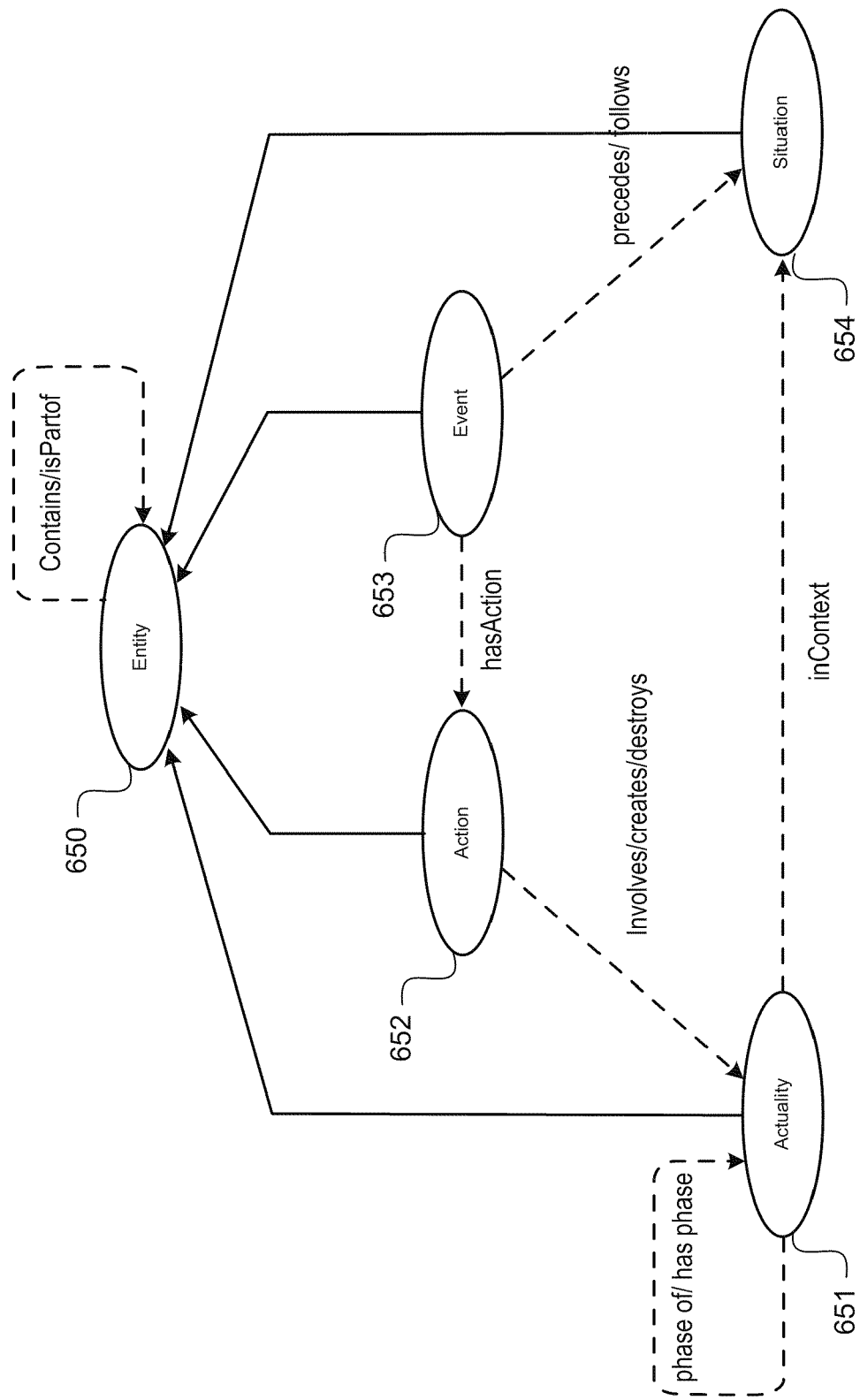
FIG. 6B illustrates an example ontology according to another embodiment of the present invention.

FIG. 6A illustrates an example implementation of a software system for generating user interfaces according to another embodiment of the present invention. Embodiments of the invention may be implemented on one or more computer systems as software, for example. In this example, program logic 601 corresponding to the user interface is described using metadata. Metadata may be used to describe the behavior or programming constructs used in program logic 601 corresponding to the user interface, or both. In one embodiment, the metadata or the interpretation model mentioned above may describe the program logic corresponding to the user interface using an ontology. An ontology as used herein means a structured description of the program logic that contains the relevant entities and their relations. An example ontology is illustrated in FIG. 6B wherein an entity 650 such as computer program logic comprises software constructs that may be modeled as actualities 651 (e.g., objects or attributes), actions 652 (e.g., methods that operate on objects and therefore create, destroy, or otherwise involve the objects), events 653 that may optionally trigger actions, and situations 654 (e.g., program states). Referring to the example in FIG. 6A, the program logic 601 is described in the metadata using an ontology comprising one or more of an object, an event, a state, and an action. Accordingly, the program logic is described in terms of one or more objects 610, one or more states 611, one or more events 612, or one or more actions 613, or combinations thereof. An example metadata file describing program logic for a mail program is shown in Appendix A hereto.

In some applications, a UI specification may be written in a template language such as an XML template language, for example. In this example, the UI specification is provided in a UI template 604 and executed by engine 603. UI template 604 may be used for binding objects, events, states, or actions described in the metadata to user interface fragments, which may be specified in the UI specification. Instructions for performing a query on metadata 602 may be embedded in the engine 603 or in the UI template 604. In the latter case, functionality specific to embodiments of the present invention may optionally be embedded in the template so that the template may be executed on a template engine. UI specifications may define an association or correspondence, such as a link or map, between objects (or actualities), states (or situations), events, or actions, or combinations thereof, with UI fragments. For example, the query may search for program state specified in metadata 602. When the states are returned in the query result, a particular state may be mapped to one or more UI fragments. For example, the system may link at least some of the metadata elements in the query result with the one or more user interface fragments based on the association specified in the user interface specification. Accordingly, UI components for implementing such UI fragments may be generated. For instance, a state specified in metadata 602 may be used to define a particular state of the program logic 601. Accordingly, when the program logic is in that particular state, the binding between the state, as specified in the metadata, and multiple UI fragments, such as a frame and multiple buttons, may cause the UI components to display such frame and buttons when the program logic is in that particular state.

In one embodiment, the UI components are implemented as UI view components 605 and UI controllers 606. An example of UI view components includes XML UI specifications that describe what is to be displayed. An example of UI controllers includes Java code to implement the functionality of the display. UI controllers 606 may receive UI events and trigger activity in the program logic. For example, a UI event may trigger a modification of an object, a change in the state of the program logic, cause an event to occur, and/or cause one or more actions to occur. UI controllers may also trigger changes in the views being presented to a user. In many applications, there is a one-to-one correspondence between program states and controllers (e.g., a particular window UI configuration may only be displayed when the program is in a particular state). Accordingly, different controllers for different states may map UI events to events in the program logic. UI controllers 606 are sometimes referred to as UI glue code because they provide a programmatic interface between the UI and program logic at runtime.

EXAMPLE—MAIL SYSTEM

Figure 7:
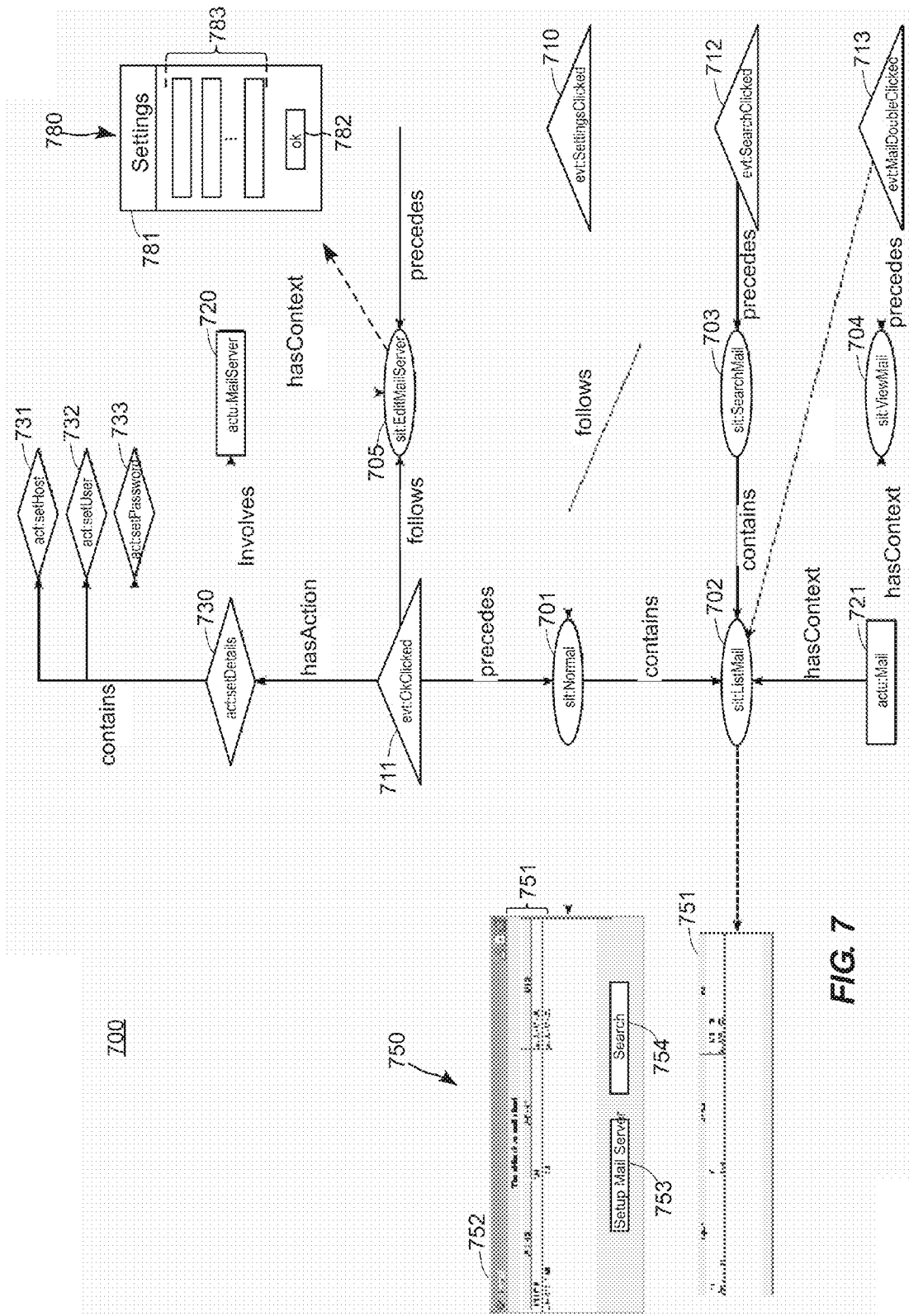
FIG. 7 illustrates an example implementation of an interpretation model according to another embodiment of the present invention.

FIG. 7 illustrates an example implementation of an interpretation model according to another embodiment of the present invention. Model 700 includes situations ("sit") 701-705, events ("evt") 710-713, actualities ("actu") 720-721, and actions ("act") 730-733. Each situation, event, actuality, and action corresponds to some programming construct in the program logic of a computer software program. Situation 701 may represent the "normal" state of the mail system ("sit: Normal"). Situation 701 may have an associated UI screen 750, which may comprise UI fragments including a table 751, window frame 752, a settings button 753 ("Setup Mail Server"), and a "Search" button 754. Situation 701 may comprise sub-situations 702 ("sit:ListMail") and situation 703 ("sit:SearchMail"). The UI fragments for displaying table 751 may be bound to situation 702 and automatically incorporated into the UI as part of situation 701. The model illustrates that if one of the rows of table 751 is double-clicked, an event 713 ("evt:MailDoubleClicked") may be triggered, and the program logic transitions to situation 704 ("sit:View-Mail"), which may access an actuality 721 ("actu:Mail"), such as a data object storing the information for a particular mail item. Situation 704 may be bound to other UI fragments for displaying the data in the object at runtime, for example. Similarly, model 700 illustrates that if button 754 is clicked, an event 712 ("evt:SearchClicked") may be triggered, and the program logic transitions to situation 703 ("sit:SearchMail"), which may trigger searching events or actions that may be bound to other UI fragments (not shown). The model illustrates that if the settings button 753 is clicked, event 710 ("evt:SettingsClicked") will be triggered and the program will transition to situation 705 ("sit:EditMailServer"), which may be bound to UI fragments 780 including window frame 781, "OK" button 782, and data entry boxes 783. Actuality 720 ("actu:MailServer"), which may be an object for storing data about the mail server's settings, for example, may be modified by entering data into the data entry boxes 783. The model illustrates that if the "OK" button 782 is clicked, then event 711 ("evt:OkClicked") is triggered. In this example, event 711 has an associated action 730, which contains actions 731, action 732, and action 733. Event 711 may be bound to UI fragments 780, and actions 730-733 may model methods of object MailServer, for example, so that when a user enters data and clicks okay in the user interface, the appropriate methods in the program logic are invoked to receive and process the data. The model illustrates that if OK is clicked, event 711 causes the system to transition from situation 705 to situation 701 (i.e., the program logic returns to "normal" and UI fragments 750 are invoked).

Figure 8A:
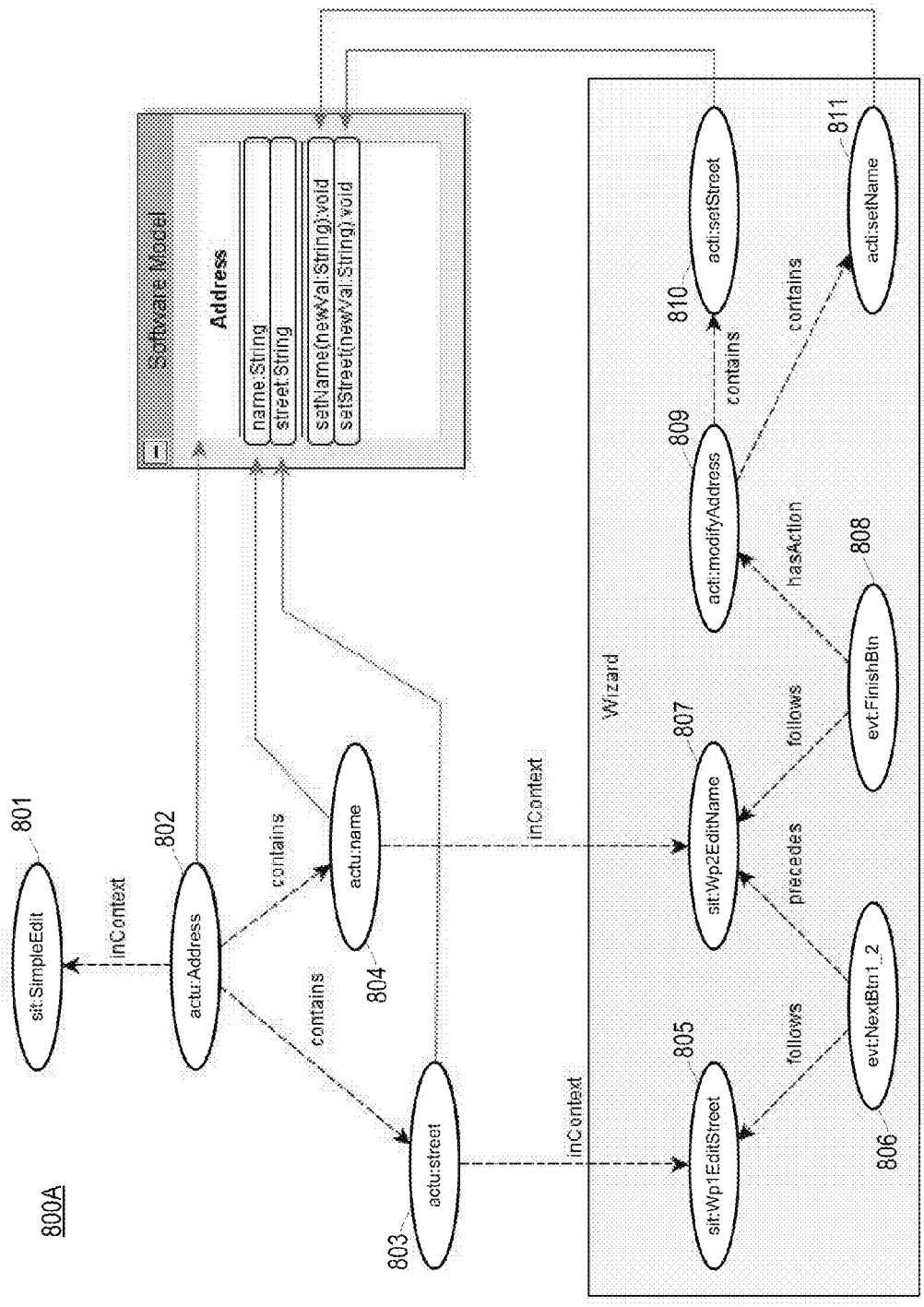
FIGS. 8A-B illustrates an example changes in program logic that are automatically used to change a UI using an interpretation model according to another embodiment of the present invention.
Figure 8B:
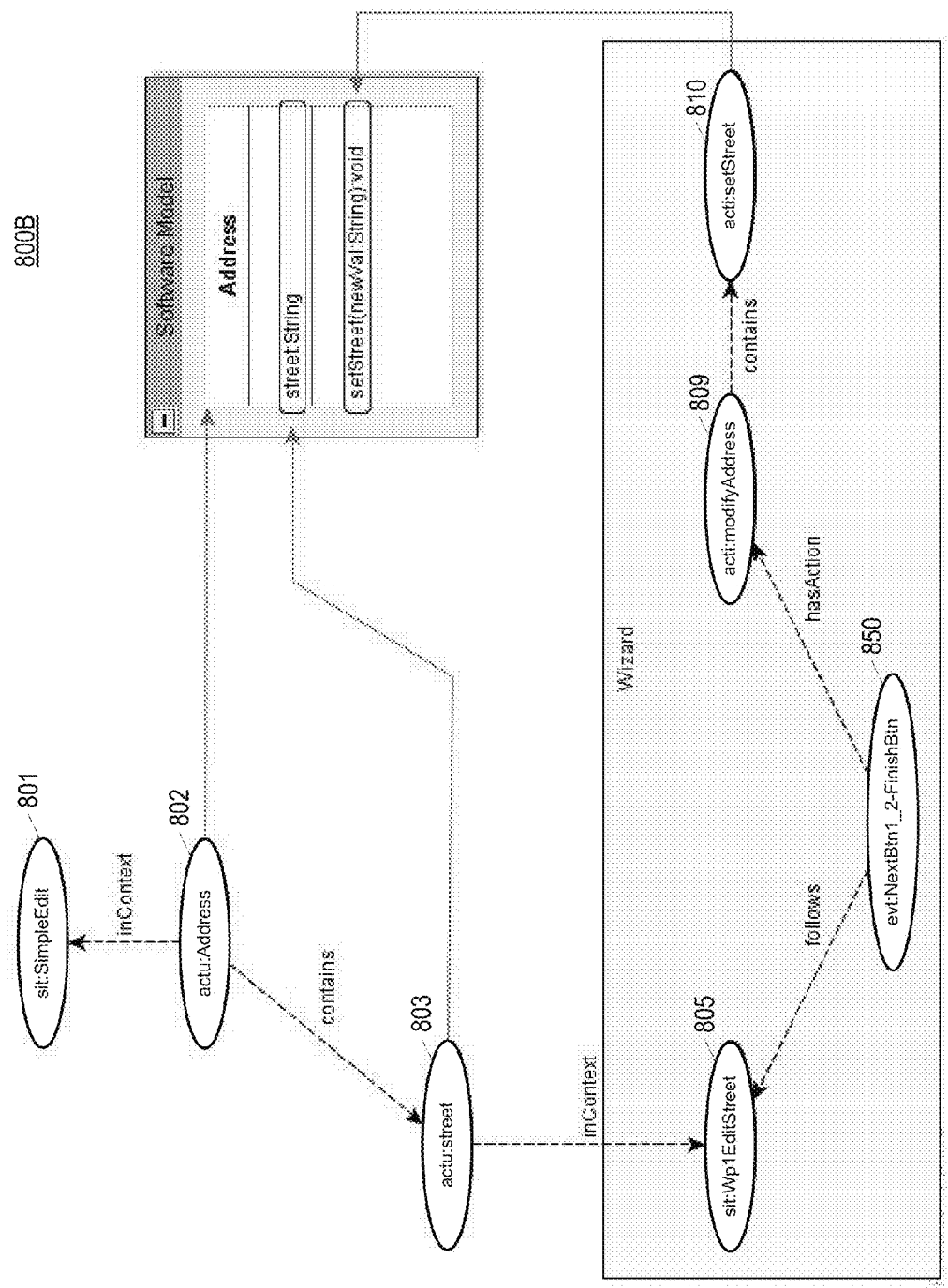

FIGS. 8A-B illustrates an example changes in program logic that are automatically used to change a UI using an interpretation model according to another embodiment of the present invention. In this example, a model may be used to describe program logic for setting the address, which may include a name and street. A corresponding user interface may display the name and street of the address. Model 800A represents the program logic for editing the name and street of the address. Model 800A may include a situation 801 ("sit: SimpleEdit") may be associated with an actuality 802 ("actu: Address"), which may in turn be associated with actualities 803 ("actu:street") and 804 ("actu:name"). Actuality 802 may be associated with a UI fragment "Address", for example, and actualities 803 and 804 may be associated with UI fragments "street" and "name", respectively. Model elements 805-810 represent the logical sequence for changing both the street and name. At situation 805 the street may be edited, followed by event 806 that triggers the transition to situation 807. At situation 807, the name may be edited, followed by event 808, which triggers activity 809. Activity 809 includes activities 810 and 811. These activities may be methods "setName (newVal:String) void" and "setStreet(newVal:String) void" in the program logic, for example.

Features and advantages of some embodiments of the present invention include interpretation models or metadata comprising rules that change the model based on the program logic, and in accordance therewith, the user interface components are automatically adapted to changes in the program logic. A model or metadata that describes program logic may include elements bound to UI fragments and may be automatically adapted to changes in the program logic. Model 800B is an alternative to model 800A where the functionality for editing the name is not include (e.g., if such functionality is not available in the program logic). Situation 805 may transition to activity 809 via a new event 850. Alternative models 800A and 800B may be selected according to rules operating on the available program logic. An example of a pseudo-coded rule that may be included for implementing alternative representations of the program logic is as follows:

```
FOREACH Situation sit THAT (isNotPresent(sit) & has at least
one event pointing to it as('precedes') & has at least 1 event
pointing to it as ('follows') DO
{
   1: create new event e
   2: set e.precedes to the situation after sit
   3: set e.follows to the situation before sit
}
```

This example rule eliminates the step for editing the name. Another embodiment of the code may be as follows:

```
[unionizeEvents:
   (?s2 ?r ?v),
   (?s2 rdf:#type base:Situation),
   (?s2 base:isPresent 'false'),
   (?precedingEvent rdf:#type base:Event),
   (?precedingEvent base:precedes ?s2),
   (?precedingEvent base:follows ?s1),
   (?followingEvent rdf:#type base:Event),
   (?followingEvent base:follows ?s2),
   (?followingEvent base:precedes ?s3) ->
       makeTemp(?compositeEvent),
       (?compositeEvent rdf:#type base:Event),
       (?compositeEvent base:contains ?precedingEvent),
       (?compositeEvent base:contains ?followingEvent),
       (?compositeEvent base:contains ?followingEvent),
       (?compositeEvent base:precedes ?s3),
       (?compositeEvent base:follows ?s1),
       drop(0, 4, 5, 7, 8) ]
```

The above examples include two parts: (1) a matching part, that performs a selection of the metadata you want to create a rule for; and (2) consequences that are to be implemented, if some metadata matches. Accordingly, using rules, if the program logic is changed, the UI fragments and related UI components that are bound to the metadata/model fragments are automatically changed. For example, as illustrated above, if a state is removed from the program logic, for example, the corresponding UI fragments are similarly removed from the UI. In the above example, the UI fragment for editing the name (e.g., displaying "name" and providing an editing field) may be removed automatically.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

APPENDIX A

METADATA

```
<?xml version="1.0" encoding="UTF-8"?>
<!DOCTYPE rdf:RDF [
  <!ENTITY rdf 'http://www.w3.org/1999/02/22-rdf-syntax-ns#'>
  <!ENTITY rdfs 'http://www.w3.org/2000/01/rdf-schema#'>
  <!ENTITY base 'file:///C:/_dissertation/_res/_code/SwiXml/
res/schema/abc.rdfs#'>
  <!ENTITY basewosquare
'file:///C:/_dissertation/_res/_code/SwiXml/res/schema/abc.rdfs/'>
  <!ENTITY model 'com/sample/foreignmodel'>
]>
<!-- xmlns="file:///C:/_dissertation/_res/_code/SwiXml/res/
schema/abc.rdfs#" -->
<rdf:RDF xml:base="&basewosquare;&model;"xmlns:base="&base;"
  xmlns:rdf="&rdf;"xmlns:rdfs="&rdfs;"xmlns:model="&model;">
  <!--
    xml:base="file:///C:/_dissertation/_res/_code/SwiXml/res/
    schema/abc.rdfs#"
    xmlns:base="file:///C:/_dissertation/_res/_code/SwiXml/res/
    schema/abc.rdfs#"
    xmlns:rdf="http://www.w3.org/1999/02/22-rdf-syntax-ns#"
    xmlns:rdfs="http://www.w3.org/2000/01/rdf-schema#"
    xmlns:model="com.sample.foreignmodel.">
  -->
  <!-- ########### helper mapping (Abstractions) ########### -->
  <!-- System -->
  <!-- ########### data object mapping (Actualities) ########### -->
  <!-- mail -->
  <base:Actuality rdf:ID="Mail">
    <base:hasContext rdf:resource="#ListMail" />
    <base:contains rdf:resource="#Mail-body" />
    <base:contains rdf:resource="#Mail-subject" />
  </base:Actuality>
  <base:Actuality rdf:ID="Mail-body" />
  <base:Actuality rdf:ID="Mail-subject" />
  <!-- mailServer -->
  <base:Actuality rdf:ID="MailServer">
    <!-- not right place here: see below -->
    <base:hasContext rdf:resource="#EditMailServer" />
    <base:contains rdf:resource="#MailServer-host" />
    <base:contains rdf:resource="#MailServer-userName" />
    <base:contains rdf:resource="#MailServer-password" />
  </base:Actuality>
  <base:Actuality rdf:ID="MailServer-host" />
  <base:Actuality rdf:ID="MailServer-userName" />
  <base:Actuality rdf:ID="MailServer-password" />
  <!-- ########### view mapping (Situations) ########### -->
  <!-- system -->
  <base:Situation rdf:ID="Normal" base:name="Normal">
    <base:contains rdf:resource="#ListMail" />
  </base:Situation>
  <!-- mail server -->
  <base:Situation rdf:ID="EditMailServer"></base:Situation>
  <base:Situation rdf:ID="SearchMail">
    <base:contains rdf:resource="#ListMail" />
  </base:Situation>
  <base:Situation rdf:ID="ViewMail"></base:Situation>
  <base:Situation rdf:ID="ListMail"></base:Situation>
  <!-- ########### event mapping (Events) ########### -->
  <!-- settings clicked -->
  <base:Event rdf:ID="SettingsClicked">
    <base:follows rdf:resource="#Normal" />
    <base:precedes rdf:resource="#EditMailServer" />
  </base:Event>
  <!-- okClicked -->
  <base:Event rdf:ID="OkClicked">
    <base:follows rdf:resource="#EditMailServer" />
    <base:precedes rdf:resource="#Normal" />
    <base:hasAction rdf:resource="#setHost" />
    <base:hasAction rdf:resource="#setUser" />
    <base:hasAction rdf:resource="#setPassword" />
  </base:Event>
  <!-- searchClicked -->
  <base:Event rdf:ID="SearchClicked">
    <base:follows rdf:resource="#Normal" />
    <base:precedes rdf:resource="#SearchMail" />
  </base:Event>
  <!-- doubleClicked -->
  <base:Event rdf:ID="MailDoubleClicked">
    <base:follows rdf:resource="#SearchMail" />
    <base:follows rdf:resource="#ListMail " />
    <base:precedes rdf:resource="#ViewMail" />
  </base:Event>
  <!-- ########### action mapping (Actions) ########### -->
  <base:Action rdf:ID="setDetails">
    <base:involves rdf:resource="#MailServer" />
    <base:contains rdf:resource="#setHost" />
    <base:contains rdf:resource="#setUser" />
    <base:contains rdf:resource="#setPassword" />
  </base:Action>
  <base:Action rdf:ID="setHost">
    <base:involves rdf:resource="#MailServer" />
  </base:Action>
  <base:Action rdf:ID="setUser">
    <base:involves rdf:resource="#MailServer" />
  </base:Action>
  <base:Action rdf:ID="setPassword">
    <base:involves rdf:resource="#MailServer" />
  </base:Action>
</rdf:RDF>
```

What is claimed is:

1. A computerized method of generating a user interface for a computer program, the method comprising:

storing, via a computer system in a non-transitory memory, an interpretation model of program logic, wherein the interpretation model describes the program logic corresponding to the user interface, and the program logic includes information for constructs for a logical behavior of the computer program;

storing, via the computer system in a non-transitory memory, a user interface specification, which includes identifiers for elements included in a set of elements and the elements are associated with user interface fragments, wherein the interpretation model is configured to include one or more elements from the set of elements;

parsing, via the computer system, the user interface specification to identify the elements;

identifying, via a search by the computer system, the one or more elements included in the interpretation model, wherein the one or more elements identified via the search are included in the program logic;

binding, via the computer system, the one or more elements identified in the interpretation model with one or more of the user interface fragments, which are associated with the elements in the user interface specification; and generating, via the computer system, user interface components based on said interpretation model, the user interface components comprising a plurality of said user interface fragments based on the binding, wherein said user interface fragments include visual user interface fragments and functional user interface fragments, the functional user interface fragments include executable code for implementing the user interface and binding with the program logic, so that particular user interface views and functionality can be implemented at runtime that correspond to the computer program logic to capture and implement the user interface.

2. The method of claim 1 wherein the interpretation model describes the program logic using an ontology.

3. The method of claim 1 wherein the interpretation model describes the program logic as one or more of an object, an event, a state, and an action.

4. The method of claim 1 wherein the interpretation model describes the program logic as one or more of an actuality, an event, a situation, and an action.

5. The method of claim 1 wherein said binding is specified in a user interface specification.

6. The method of claim 1 wherein the interpretation model comprises rules that change the model based on the program logic, and in accordance therewith, the user interface components are automatically adapted to changes in the program logic.

7. The method of claim 1 further comprising searching the interpretation model for specified elements of said interpretation model.

8. A computerized method of generating a user interface for a computer program, the method comprising:
   storing, in a non-transitory memory, metadata that describes program logic corresponding to the user interface, wherein the program logic includes information for constructs for a logical behavior of the computer program, the metadata describes the program logic using metadata elements comprising one or more of a state, an event, an object, and an action, and wherein the metadata further comprises rules specifying alternative configurations of said program logic and corresponding alternative metadata elements;
   receiving a user interface specification, the user interface specification specifying an association between one or more the metadata elements and one or more user interface fragments;
   parsing, via the computer system, the user interface specification to identify the metadata elements;
   performing a query to search the metadata for the one or more of the metadata elements specified in the user interface specification, wherein the query searches the metadata for the elements specified in the user interface specification in accordance with said rules;
   returning a query result comprising metadata elements identified in the metadata via the query;
   linking at least some of the identified metadata elements in the query result with some of the user interface fragments based on the association between the one or more of the metadata elements and the one or more of the user interface fragments specified in the user interface specification;
   generating first user interface components based on said identified metadata elements in the query result, the first user interface components comprising a first plurality of said user interface fragments based on the linking, wherein said user interface fragments include visual user interface fragments and functional user interface fragments, the functional user interface fragments include executable code for implementing the user interface and binding with the program logic, so that particular user interface views and functionality can be implemented at runtime that correspond to the computer program logic to capture and implement the user interface; and
   changing the program logic including:
      capturing changes in the program logic by the interpretation model; and
      automatically generating second user interface components by translating the changes in the program logic into corresponding changes in the user interface based on the rules specifying alternative configurations of said program logic and corresponding alternative metadata elements in said metadata, the second user interface components comprising a second plurality of said user interface fragments, so that alternative user interface views and functionality can be implemented at runtime that correspond to the changes in computer program logic to capture and implement an alternative user interface.

9. The method of claim 8 wherein the user interface specification is a template executed on a template engine.

10. The method of claim 8 wherein the user interface components comprise XML files describing a user interface.

11. The method of claim 8 wherein the user interface components comprise controllers for interfacing with the program logic.

12. A non-transitory computer-readable medium containing instructions for controlling a computer system to perform a method of generating a user interface for a computer program, the method comprising:
   storing metadata that describes program logic corresponding to the user interface, wherein the program logic includes information for constructs for a logical behavior of the computer program, and the metadata describes the program logic using metadata elements including one or more of a situation, an event, an actuality, and an action, wherein the metadata further comprises rules specifying alternative configurations of said program logic and corresponding alternative metadata elements;
   receiving a user interface specification, the user interface specification specifying an association between one or more the metadata elements and one or more user interface fragments;
   parsing, via the computer system, the user interface specification to identify the one or more of the metadata elements;
   performing a query to search the metadata for the one or more elements specified in the user interface specification;
   returning a query result comprising metadata elements identified in the metadata via the query;
   linking the identified metadata elements in the query result with a plurality of interface fragments based on the association between the one or more of the metadata elements and the one or more of the user interface fragments specified in the user interface specification;
   generating first user interface components based on said identified metadata elements in the query result, the first user interface components comprising a first plurality of said user interface fragments based on the linking, wherein said user interface fragments include visual user interface fragments and functional user interface fragments, the functional user interface fragments include executable code for implementing the user interface and binding with the program logic, so that particular user interface views and functionality can be implemented at runtime that correspond to the computer program logic to capture and implement the user interface; and
   changing the program logic including,
      capturing changes in the program logic by the interpretation model; and
      automatically generating second user interface components by translating the changes in the program logic into corresponding changes in the user interface based on the rules specifying alternative configurations of said program logic and corresponding alternative metadata elements in said metadata, the second user interface components comprising a second plurality of said user interface fragments, so that alternative user interface views and functionality can be implemented at runtime that correspond to the changes in computer program logic to capture and implement an alternative user interface.

13. The non-transitory computer-readable medium of claim 12 wherein the metadata describes the program logic using an ontology.

14. The non-transitory computer-readable medium of claim 12 wherein the metadata describes the program logic as one or more of an object, an event, a state, and an action.

15. The non-transitory computer-readable medium of claim 12 wherein the metadata describes the program logic as one or more of an actuality, an event, a situation, and an action.

16. The non-transitory computer-readable medium of claim 12 wherein said binding is specified in a user interface specification.

17. The non-transitory computer-readable medium of claim 12 wherein the metadata comprises rules that change the model based on the program logic, and in accordance therewith, the user interface components are automatically adapted to changes in the program logic.

18. The non-transitory computer-readable medium of claim 12 further comprising searching metadata for one or more specified metadata elements.

19. A computer system including software for generating a user interface for a computer program, the system comprising:
   a non-transitory computer-readable medium configured to store:
      a computer program comprising program logic, wherein the program logic includes information for constructs for a logical behavior of the computer program;
      an interpretation model that describes said program logic corresponding to a user interface for said computer program as a plurality of model elements, wherein the interpretation model further comprises rules specifying alternative configurations of said program logic and corresponding alternative interpretation model elements;
      one or more of user interface fragments;
      a user interface specification, the user interface specification specifying an association between one or more of the model elements and the one or more of the user interface fragments;
      computer code for parsing the user interface specification to identify the model elements;
      computer code for identifying via a search the one or more of the model elements, from the user interface specification, included in the program logic;
      computer code for binding the one or more model elements from the interpretation model with the one or more of the user interface fragments; and
      a user interface component generator for generating first user interface components based on said association between the one or more of the model elements and the one or more of the user interface fragments, the first user interface components comprising a first plurality of said user interface fragments based on the binding, wherein said user interface fragments include visual user interface fragments and functional user interface fragments, the functional user interface fragments include executable code for implementing the user interface and binding with the program logic, so that particular user interface views and functionality can be implemented at runtime that correspond to the computer program logic to capture and implement the user interface;
   computer code for changing the program logic including:
      computer code for capturing changes in the program logic by the interpretation model; and
      the user interface component generator automatically generating second user interface components by translating the changes in the program logic into corresponding changes in the user interface based on the rules specifying alternative configurations of said program logic and corresponding alternative metadata elements in said metadata, the second user interface components comprising a second plurality of said user interface fragments, so that alternative user interface views and functionality can be implemented at runtime that correspond to the changes in computer program logic to capture and implement an alternative user interface.

20. The computer system of claim 19 wherein the interpretation model describes the program logic using an ontology.

21. The computer system of claim 19 wherein the interpretation model describes the program logic using elements comprising one or more of a state, an event, a object, and an action.

22. The computer system of claim 19 further comprising a query, wherein the query performs search for model elements specified in the user interface specification, and wherein the query searches the interpretation model for the model elements specified in the user interface specification in accordance with said rules and returns a query result comprising model elements, and wherein model elements in the query result are linked with the one or more user interface fragments based on the association specified in the user interface specification.

23. The method of claim 1, wherein the user interface fragments include visual user interface fragments.

24. The method of claim 23, wherein the visual user interface fragments include a button, a frame, a menu, a table, or a tree.

25. The method of claim 23, wherein the user interface fragments include functional user interface fragments.

26. The method of claim 25, wherein the functional user interface fragments include executable code for implementing the user interface and binding with the program logic.

* * * * *